US012579470B2

(12) United States Patent    (10) Patent No.:   US 12,579,470 B2
Patel et al.    (45) Date of Patent:   Mar. 17, 2026

(54) SYSTEMS AND METHODS FOR DISTRIBUTING LAYERS OF SPECIAL MIXTURE-OF-EXPERTS MACHINE LEARNING MODELS

(71) Applicant: MICROSOFT TECHNOLOGY LICENSING, LLC, Redmond, WA (US)

(72) Inventors: Devangkumar Rameshbhai Patel, Fremont, CA (US); Wei Zuo, Campbell, CA (US); Yuan Yu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 904 days.

(21) Appl. No.: 17/848,679

(22) Filed: Jun. 24, 2022

(65)     Prior Publication Data

US 2023/0419166 A1    Dec. 28, 2023

(51) Int. Cl.
   *G06F 18/00*       (2023.01)
   *G06F 18/214*     (2023.01)
   *G06N 20/00*      (2019.01)
   *G06T 1/60*        (2006.01)

(52) U.S. Cl.
   CPC ........... *G06N 20/00* (2019.01); *G06F 18/214* (2023.01); *G06T 1/60* (2013.01)

(58) Field of Classification Search
   None
   See application file for complete search history.

(56)      References Cited

U.S. PATENT DOCUMENTS

| | | | |
|---|---|---|---|
| 10,719,761 B2 | 7/2020 | Shazeer et al. | |
| 11,003,823 B2 | 5/2021 | Matei et al. | |
| 12,093,830 B2 * | 9/2024 | Izadi ...................... | G06N 3/045 |
| 2019/0042538 A1 * | 2/2019 | Koren .................... | G06F 7/523 |
| 2019/0188577 A1 | 6/2019 | Malaya et al. | |
| 2020/0117978 A1 | 4/2020 | Chen et al. | |
| 2020/0226453 A1 | 7/2020 | Luk et al. | |
| 2020/0279150 A1 * | 9/2020 | Shazeer ............... | G06N 3/0495 |
| 2021/0342675 A1 | 11/2021 | Kotler et al. | |
| 2022/0012564 A1 | 1/2022 | Zjajo et al. | |
| 2022/0012858 A1 | 1/2022 | Pardeshi et al. | |
| 2022/0036186 A1 * | 2/2022 | Refaat .................... | G06N 3/088 |

(Continued)

OTHER PUBLICATIONS

Nunez-Yanez, et al., "Sparse and Dense Matrix Multiplication Hardware For Heterogeneous Multi-Precision Neural Networks", In Journal of Array, vol. 12, Dec. 1, 2021, 11 Pages.

(Continued)

*Primary Examiner* — Farhan M Syed
(74) *Attorney, Agent, or Firm* — Workman Nydegger

(57)      ABSTRACT

Some disclosed embodiments are directed to computing systems having different accelerators such that a first set of accelerators has a greater memory capability than a second set accelerators, while the second set of accelerators has a greater processing capability than the first set of accelerators. A machine learning model having different dense layers and sparse layers is distributed on the different accelerators such that the dense layers are distributed on one or more accelerators selected from the first set of accelerators and the sparse layers are distributed on one or more accelerators in the second set of accelerators.

20 Claims, 12 Drawing Sheets

(56)                    References Cited

U.S. PATENT DOCUMENTS

2022/0059200 A1      2/2022  Rahbar et al.
2022/0253680 A1*    8/2022  Zhao ...................... G06N 3/088
2023/0281510 A1*    9/2023  Royer ................... G06N 3/084
                                                            706/12

OTHER PUBLICATIONS

"International Search Report and Written Opinion Issued in PCT Application No. PCT/US23/022447", Mailed Date: Aug. 4, 2023, 13 Pages.

Shazeer, et al., "Outrageously Large Neural Networks: The Sparsely-Gated Mixture-of-Experts Layer", In Repository of arXiv:1701. 06538v1, Jan. 23, 2017, 19 Pages.

* cited by examiner

SYSTEMS AND METHODS FOR DISTRIBUTING LAYERS OF SPECIAL MIXTURE-OF-EXPERTS MACHINE LEARNING MODELS

BACKGROUND

Machine learning models using mixture-of-expert (MOE) techniques are typically made up of N number of layers which are broadly classified as MOE layers and non-MOE layers. Various distribution strategies are used to distribute large MOE machine learning models into computing system hardware.

When a model is distributed according to conventional MOE distribution strategies, a single accelerator, or graphics processing unit (GPU) will be assigned some or all of layers of the model, including MOE layers, as well as non-MOE layers. However, there are many problems associated with such distributions. For example, certain components will remain idle while other components are still processing input data. Furthermore, such models are not scalable because of the limitations of the current hardware devices of existing computing systems. Additionally, training MOE models that have many distributed layers and experts can be computationally heavy and time-consuming.

In view of the foregoing, there is an ongoing need for improved systems and methods for MOE machine learning models that can be distributed on different types of hardware configurations. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for distributing MOE models into various system configurations.

In some embodiments, the MOE models are distributed in systems comprising a plurality of accelerators, including a first set of accelerators and a second set of accelerators, wherein the accelerators in the second set of accelerators, according to these embodiments, have a greater memory capability than accelerators in the first set of accelerators, and accelerators in the first set of accelerators have a greater processing capability than accelerators in the second set of accelerators.

In some embodiments, an MOE model is configured with a plurality of dense layers and a plurality of sparse layers that are distributed on a plurality of system accelerators, such as the first and second sets of accelerators mentioned above, such that the plurality of dense layers is distributed on one or more accelerators selected from the first set of accelerators and the plurality of sparse layers are distributed on one or more accelerators in the second set of accelerators. In some instances, the machine learning model is further distributed in such a manner that at least one accelerator storing one or more sparse layers of the machine learning model is configured to receive multiple inputs from one or more accelerators storing dense layers of the machine learning model.

As described herein, disclosed embodiments are also directed to systems and methods for distributing different dense and sparse layers of a machine learning model onto a customized computing system. For example, systems are configured to access a machine learning model comprising a plurality of dense layers and a plurality of sparse layers and identify a number of dense layers and a number of experts included in the machine learning model. The systems are also configured to access a computing system comprising a plurality of accelerators, wherein at least some accelerators have a greater memory capability than other accelerators and at least some accelerators have a greater processing capability than other accelerators, identifying which accelerators are available, and determine which accelerators of the available accelerators are configured to support dense layers and which accelerators are configured to support experts.

Disclosed systems are also configured to distribute the plurality of dense layers to one or more available accelerators configured to support dense layers and distribute the number of experts to one or more available accelerators configured to support experts, such that the one or more accelerators configured to support experts is configured to receive multiple inputs from the one or more accelerators configured to support dense layers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards systems and methods for distributing a machine learning model comprising an MOE onto a computing system. In this regard, it will be appreciated that some of the disclosed embodiments are specifically directed to improved systems and methods for determining a distribution of the machine learning based on separating sparse layers from dense layers on customized hardware devices. The disclosed embodiments provide many technical advantages over existing systems.

For example, conventional transformer-based machine learning models are constructed using a stack of transformer layers which process input data in a sequence. For example, the output from a previous transformer layer is used as input to the next transformer layer. All neurons from a typical transformer layer participate in processing each input. Transformer layers that employ all or most of the neurons within the layer are identified as dense layers, while transformer layers that employ one or a limited number of neurons within the layer are identified as sparse layers. Dense layers require a high number of floating-point operations (FLOPS) and a large amount of GPU memory to process inputs. Machine learning models which are configured in this manner with dense layers are difficult to scale.

Some data scientists have started using a variant of the traditional transformer layer, which has come to be known as a mixture of experts (MOE) layer as a way to scale the machine learning models. MOE layers, in some instances, which are a type of sparse layer, are built using a collection of experts. For example, if a model is being trained to perform a particular task, that particular task (e.g., a predictive modeling task) can be decomposed into two or more sub-tasks. Each expert is then trained on one of the sub-tasks. While in some instances, the experts are configured as models, such as a neural network having its own set of nodes or neurons, the experts can also be referred to as nodes or neurons when the collection of experts within a particular machine learning model layer form a neural network. Thus, in the case of the MOE layer (i.e., sparse layer), each input can be processed by a limited subset of experts (i.e., neurons) from the MOE layer.

Figure 1A:
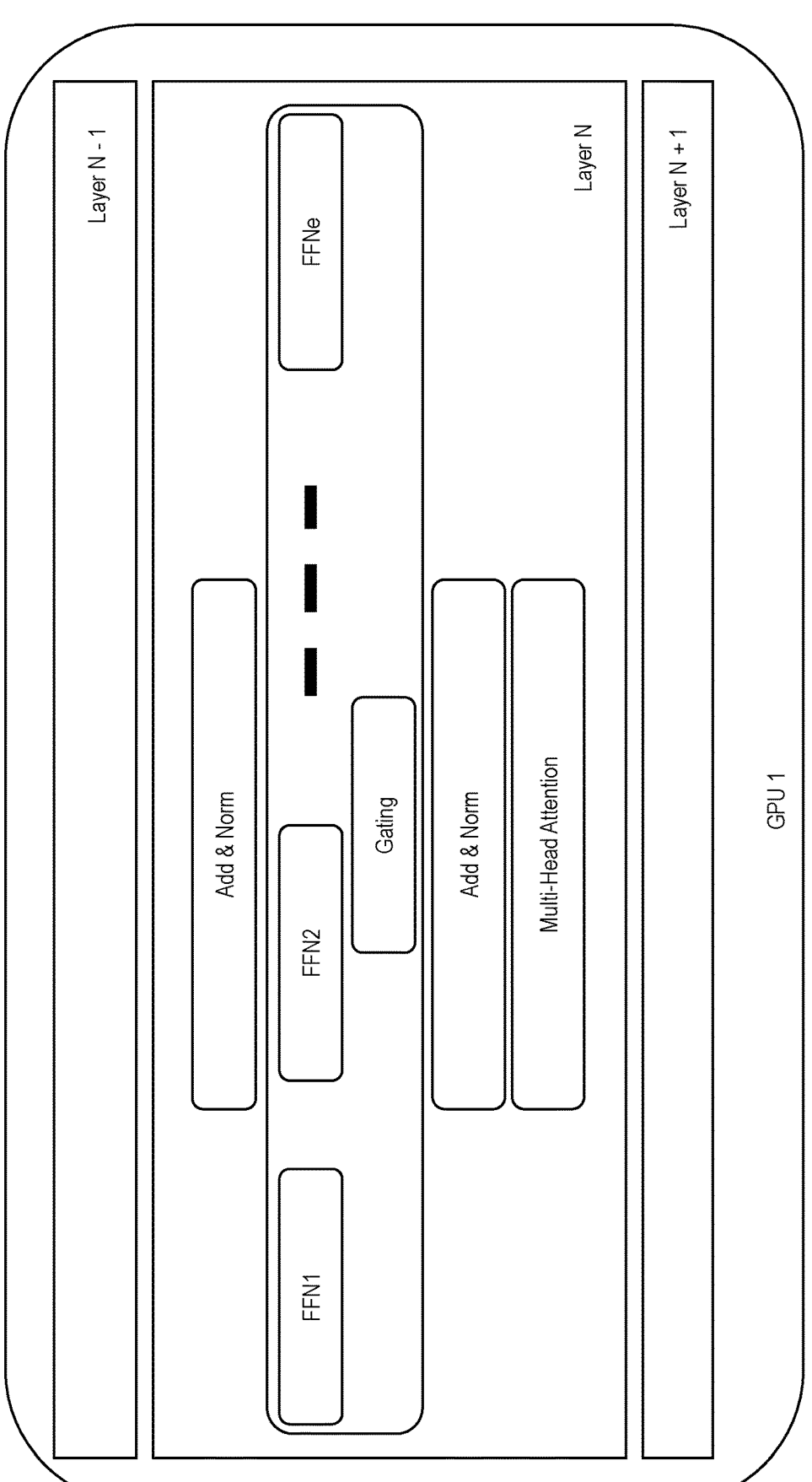
FIGS. 1A-1D illustrates various example embodiments of existing MOE systems.

This is in contrast to dense layers where all or most neurons participate in the data processing, instead of a select few as is the case for sparse layers. In some existing systems, the entire machine learning model including dense and sparse layers are distributed onto a single piece of hardware, referred to herein as an accelerator (e.g., GPU 1), as illustrated in FIG. 1A. For example, as illustrated, GPU 1 comprises a plurality of layers (e.g., Layer N−1, Layer N, and Layer N+1). Layer N further comprises an Add & Norm layer, one or more experts on feed forward network layers (e.g., FFN1, FFN2, FFNe, etc.), a gating layer, an additional Add & Norm layer, as well as a multi-head attention layer. In this manner, Layer N−1 and Layer N+1 are dense layers, while the sparse layer within Layer N comprises the different experts.

With regard to the foregoing, it will be appreciated that there are many different types of accelerators, including but not limited to, a hardware accelerator, a graphics accelerator, a cryptographic accelerator, a web accelerator, PHP accelerator, or other type of accelerator, all of which are collectively referred to herein as accelerators, and each of which comprise one or more dense or sparse layers of a corresponding machine learning model.

Figure 1B:
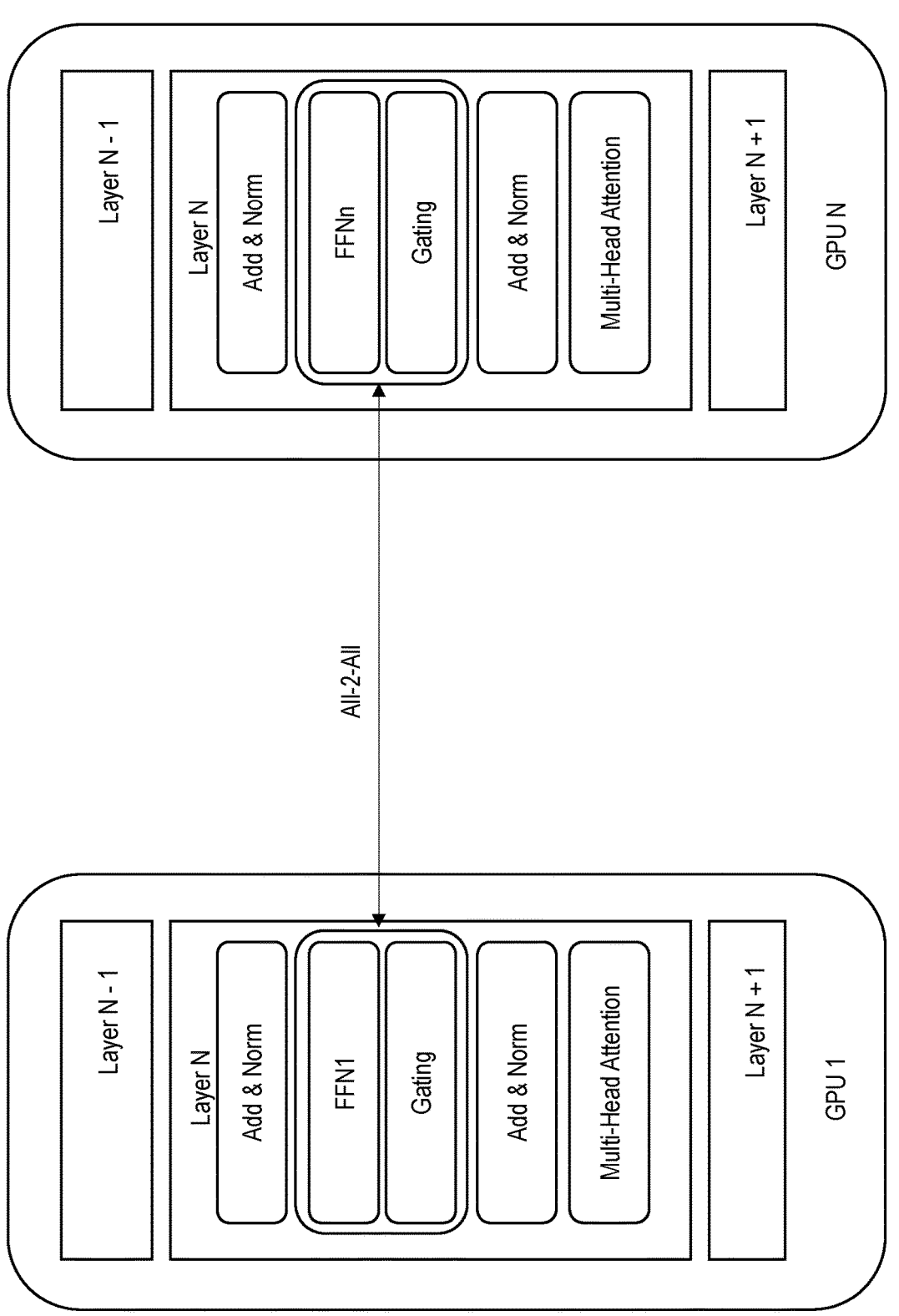

The different layers of an MOE-based transformer machine learning model are configurable in a variety of configurations. In some existing systems, the different layers of the machine learning model are distributed onto a plurality of accelerators (e.g., GPU 1and GPU N), wherein each accelerator has a single expert in its sparse layer, as illustrated in FIG. 1B. For example, while each of GPU 1 and GPU N have similar layer configurations as GPU 1 in FIG. 1A, both GPU 1 and GPU N each only comprise a single expert (e.g., FFN1 in GPU 1 and FFNn in GPU N) within its sparse layer, Layer N.

Figure 1C:
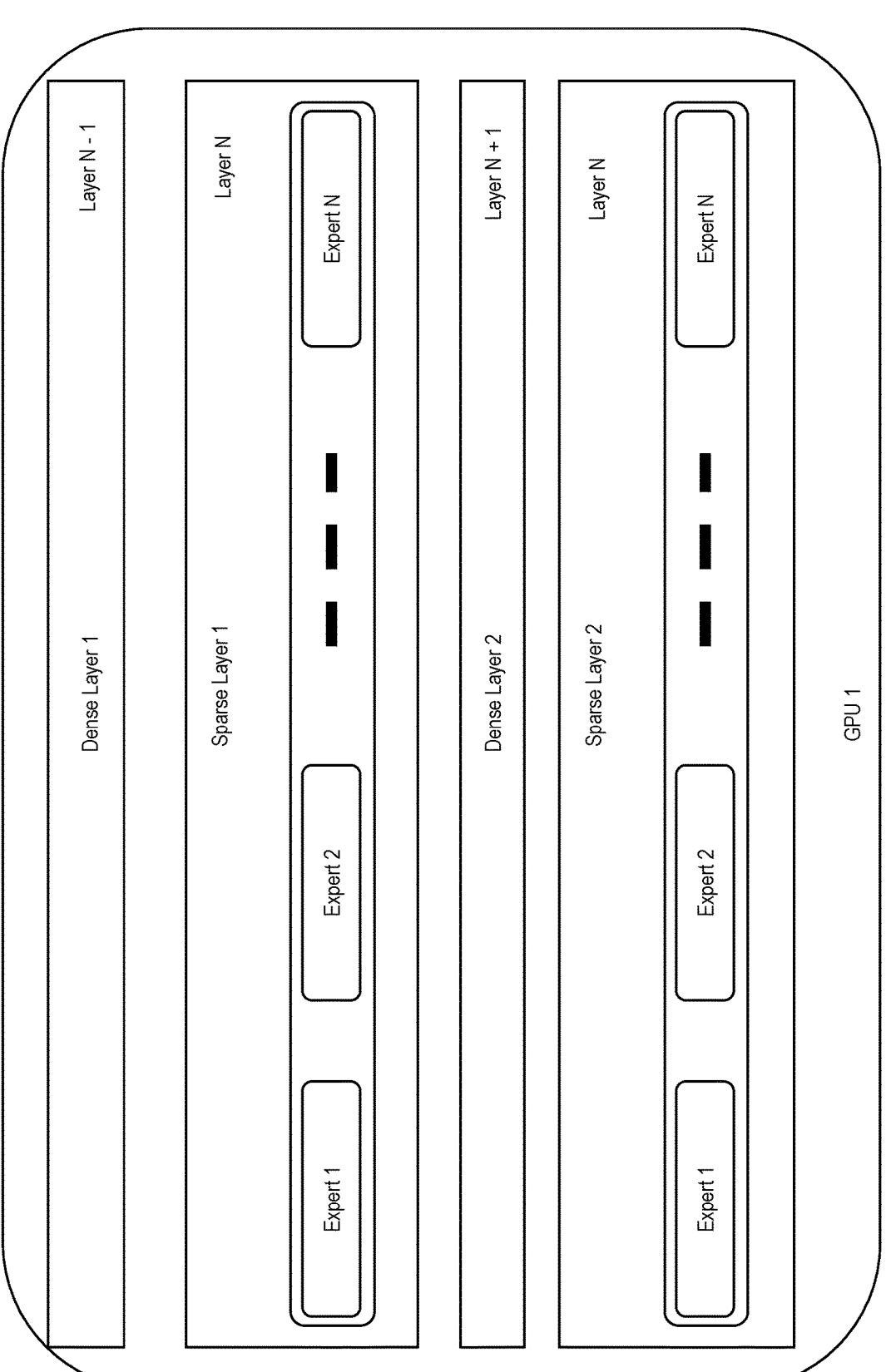

In some configurations, the dense layers and sparse layers are interleaved. For example, if a machine learning model is constructed using two dense layers (e.g., Dense Layer 1, Dense Layer 2) and two sparse layers (e.g., Sparse Layer 1, Sparse Layer 2), the machine learning model can be configured according to FIG. 1C. As illustrated, input data is processed first by Dense Layer 1, then by Sparse Layer 1, then Dense Layer 2, then Sparse Layer 2, in order to generate the final output.

Figure 1D:
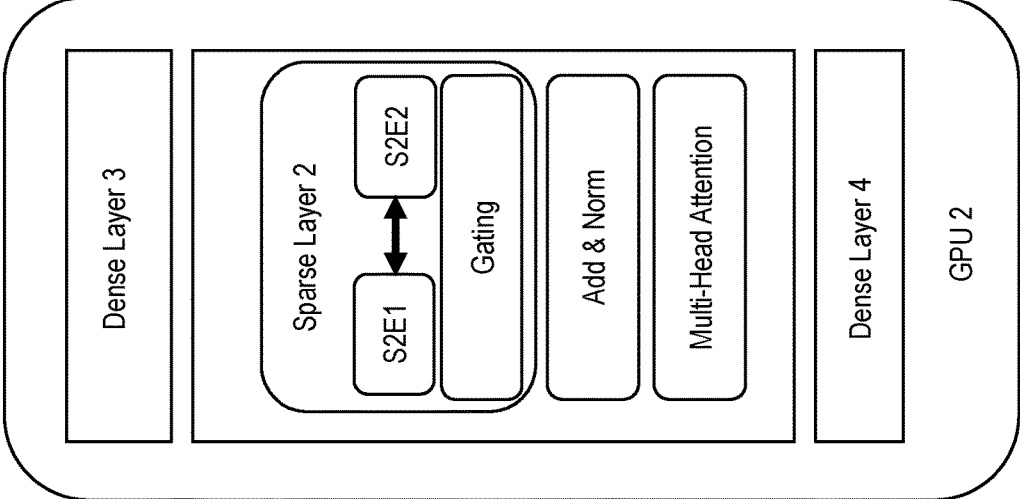
Figure 1D:
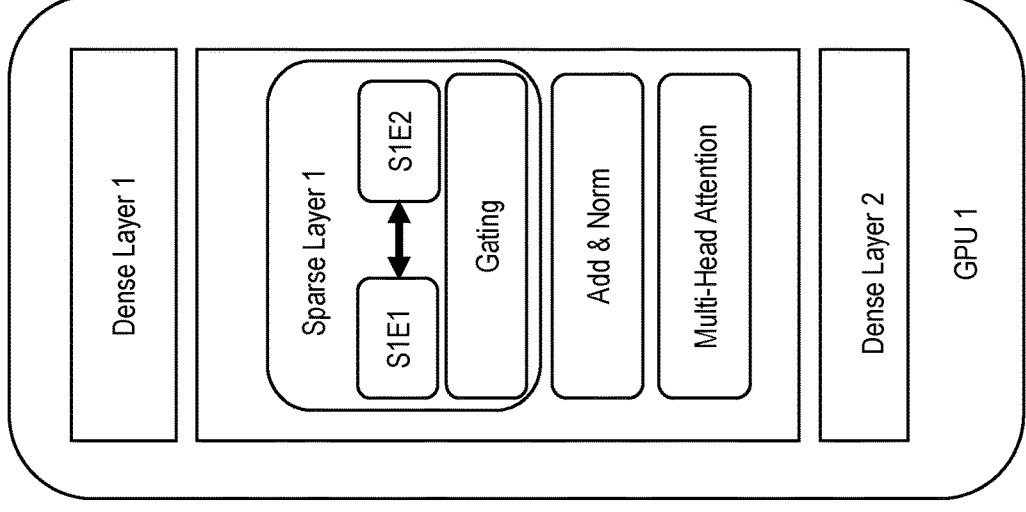

In FIG. 1D, each sparse layer is made up of at least two experts. For example, Sparse Layer 1 comprises a first plurality of experts (e.g., S1E1, S1E2) and Sparse Layer 2 comprises a second plurality of experts (e.g., S2E1, S2E2). In order to accommodate such a large machine learning model (i.e., the entire model will not fit onto a single accelerator), the layers of the machine learning model are distributed onto more than one accelerator. For example, Dense Layer 1, Sparse layer 1, and Dense Layer 2 are distributed on GPU1, while Dense Layer 3, Sparse Layer 2, and Dense Layer 4 are distributed on GPU2. However, this distribution scheme, often referred to as Model Parallelism, is highly inefficient because while GPU1 is processing an input, GPU2 remains idle, and while GPU2 is processing an input, GPU1 is idle.

Some work has focused on mitigating this inefficiency by introducing a processing pipeline, such that when GPU2 is processing the first input (after the first input has been processed by GPU1), GPU1 starts processing a second input. However, this configuration still has drawbacks in that the GPU utilization remains low because any experts in the one or more sparse layers that are not participating in processing a given input still occupy significant GPU memory.

An additional improvement has been explored, referred to as Expert Parallelism which provides for a model configuration where experts are evenly distributed across GPUs. In such configurations, the system can process up to N inputs simultaneously based on N number of GPUs. In one example, where there are four GPUs and four experts, each GPU allocates for only a single expert from each sparse layer. In this configuration, the system can process up to four inputs simultaneously. The sparse layers will exchange inputs such that each input is sent to the GPU where the expert which has been selected to process the input is stored. However, even this improvement still experiences limited capabilities. For example, each GPU processes dense layers, in addition to sparse layers. In some instances, his is inefficient because large amounts of memory are taken up by the sparse layers, which do require less processing than dense layers. This decreases the overall computational efficiency of the system. Additionally, or alternatively, the model on each GPU consumes the same amount of memory and computation resource. Thus, scalability is bound by the GPU with the least computation power and memory, which results in inefficiencies in GPUs in the system that have larger memory storage and/or computational power.

Figure 2:
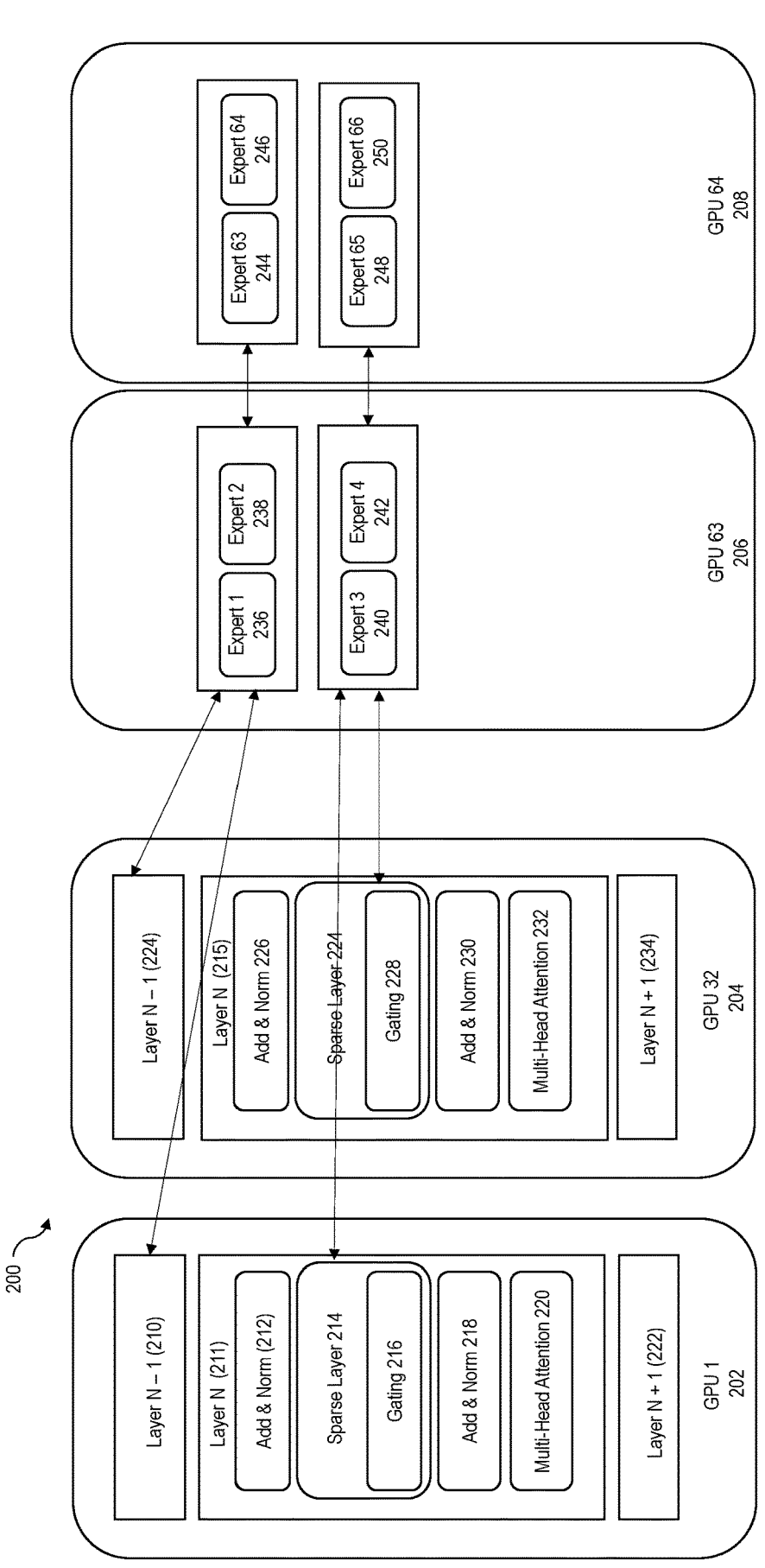
FIG. 2 illustrates an example diagram of an MOE machine learning model distributed on a computing system according to the disclosed embodiments.

Attention will be directed to FIG. 2, which illustrates an example embodiment of a special expert machine learning model, wherein sparse layers are distributed onto sparse hardware and dense layers are distributed onto dense hardware, and wherein sparse layers are interleaved with the dense layers such that the sparse hardware can process multiple outputs from multiple dense hardware devices. The disclosed embodiments provide many technical advantages over existing systems.

For example, computing system 200 is shown having a plurality of accelerators (e.g., accelerator 202, accelerator 204, accelerator 206, accelerator 208, and one or more other accelerators not illustrated). A machine learning model is distributed onto the various accelerators. For example, a first plurality of model layers (e.g., layer 210, layer 211, and layer 222) are shown distributed onto accelerator 202. Each layer further comprises one or more layers (i.e., sub-layers). For example, layer 211 comprises layer 212 (e.g., Add & Norm), layer 214 (e.g., Sparse Layer) which further includes a gating layer 216, layer 218 (e.g., Add & Norm), and layer 220 (e.g., Multi-Head Attention).

Similarly, a second plurality of model layers (e.g., layer 224, layer 215, and layer 234) are shown distributed onto accelerator 204. Each layer further comprises one or more layers (i.e., sub-layers). For example, layer 215 comprises layer 226 (e.g., Add & Norm), layer 224 (e.g., Sparse Layer) which further includes a gating layer 228, layer 230 (e.g., Add & Norm), and layer 232 (e.g., Multi-Head Attention).

As described above, in conventional systems, the sparse layers would comprise one or more experts. However, in the illustrated embodiment, which is representative of some disclosed embodiments herein, the experts from the different sparse layers have been distributed onto separate accelerators. For example, expert 236 and expert 238 from a sparse layer associated with layer 210 and expert 240 and expert 242 from layer 214 associated with layer 211 are distributed onto accelerator 206. Additionally, expert 244, expert 246, expert 248, and expert 250 are distributed onto accelerator 208. As shown, the experts are configured to receive different inputs from various layers of the machine learning model as distributed across multiple accelerators. This prevents certain components from being idle while other components are actively processing data.

In this manner, MOE layers and non-MOE layers are segregated into separate groups and each group is assigned its own set of accelerators. By distributing the machine learning model according to this configuration, computing systems are able to achieve the following technical advantages. First, the system is able to apply specific performance optimizations that are suitable for dense computations and sparse computations in a selective manner. Additionally, MOE layers incorporate heavy communication overheads. Thus, configurations, like the one illustrated in FIG. 2, enables the system to exploit higher communication bandwidth available within a subset of the cluster (e.g., on a single node or nodes in single rack).

Furthermore, a single set of MOE layers can be scheduled, according to the disclosed embodiments, to process multiple interleaving inputs to increase the model throughput (either for training, inference, and/or implementation) efficiently.

The disclosed embodiments are also directed to systems and methods which are capable of using heterogynous clusters to reduce computational cost and improve performance of the computing system/machine learning model. In particular, such configurations facilitate a significant reduction in time necessary for training of the machine learning, thus allowing users to deploy the machine learning model into implementation tasks more quickly.

Figure 3:
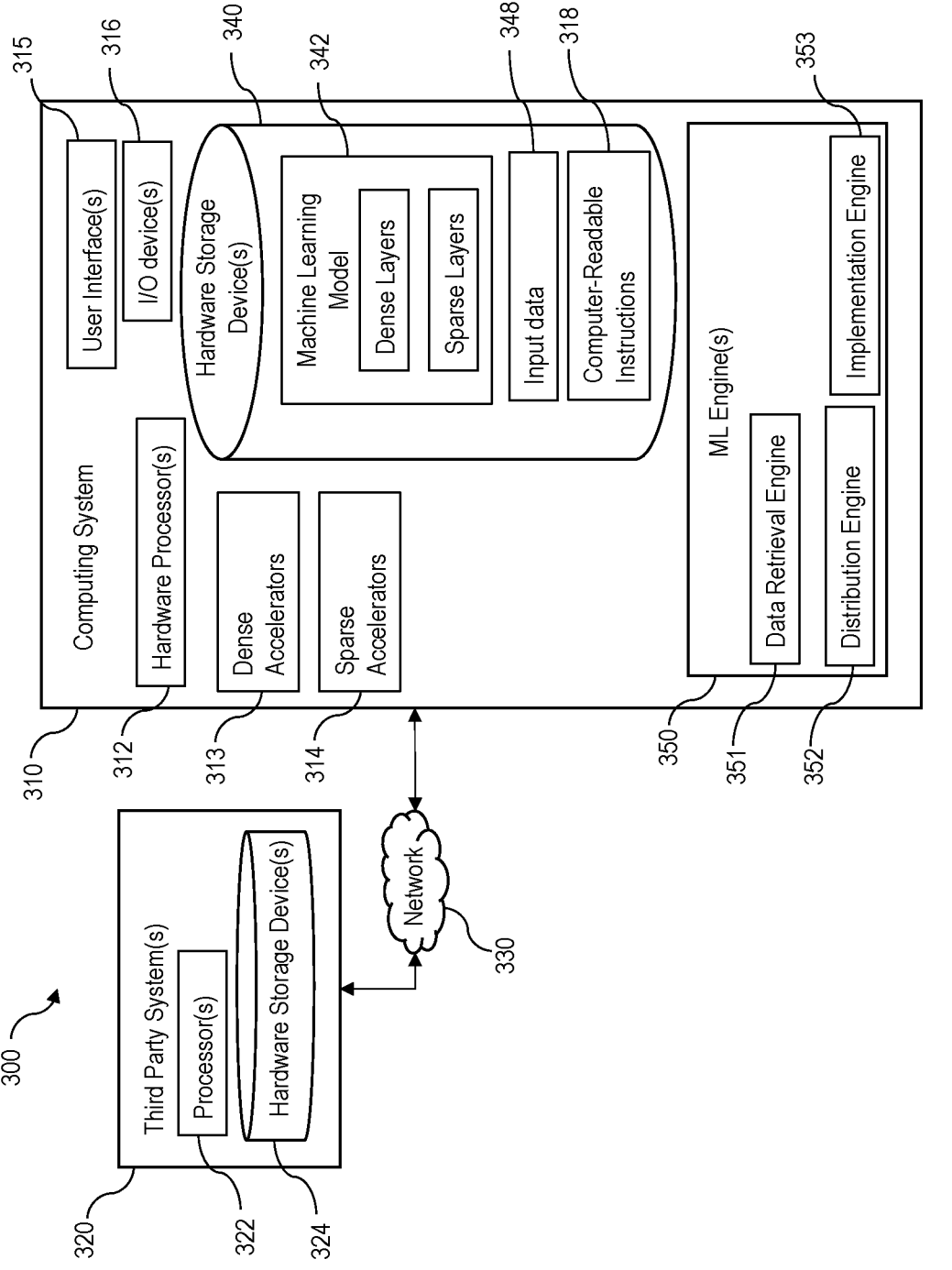
FIG. 3 illustrates a computing environment in which a computing system incorporates and/or is utilized to perform disclosed aspects of the disclosed embodiments.

Attention will now be directed to FIG. 3, which illustrates components of a computing system 310 which may include and/or be used to implement aspects of the disclosed invention. As shown, the computing system includes a plurality of machine learning (ML) engines, models, and data types associated with inputs and outputs of the machine learning engines and models. For example, FIG. 3 illustrates the computing system 310 as part of a computing environment 300 that also includes remote/third party system(s) 320 in communication (via a network 330) with the computing system 310. The computing system is in communication with remote/third party system(s) 320 comprising one or more processor(s) 322 and one or more computer-executable instruction(s) 324. It is anticipated that, in some instances, the remote/third party system(s) 320 further comprise databases housing data that could be used as training data, for example, external speaker data. Additionally, or alternatively, the remote/third party system(s) 320 include machine learning systems external to the computing system 310. In some embodiments, the remote/third party system(s) 320 are software programs or applications.

The computing system 310, for example, includes one or more processor(s) 312 (such as one or more hardware processor(s)) and a storage (i.e., hardware storage device(s) 340) storing computer-executable instructions 318. One or more of the hardware storage device(s) 340 is able to house any number of data types and any number of computer-executable instructions 318 by which the computing system 310 is configured to implement one or more aspects of the disclosed embodiments when the computer-executable instructions 318 are executed by the one or more processor (s) 312.

The computing system 310 further comprises a plurality of accelerators (e.g., dense accelerators 313 and sparse accelerators 314). In some configurations, dense accelerators 313 are configured to process input data using dense layers, wherein the dense accelerators 313 are customized hardware optimized for processing power. In such configurations, the sparse accelerators 314 are configured to process input data using sparse layers, wherein the sparse accelerators 314 are customized hardware optimized for memory storage. The sparse accelerators 314 are more efficient in processing sparse data (e.g., sparse tensors, sparse layers) than dense accelerators. Each of the accelerators can comprise a specialized processor or other hardware capable of storing and/or executing the corresponding dense and sparse layers (344 and 346, respectively).

In some instances, the sparse accelerators have at least a 10% greater memory or storage capacity than the dense accelerators, or even more than that (e.g., 20%, 30%, 40%, 50%, 60%, 70%, 80%, 90% or even more than 100% greater memory storage capacity than the dense accelerators). Additionally, or alternatively, the sparse accelerators are at least 10% more efficient than dense accelerators in processing sparse data, or even more than that (e.g., 20%, 30%, 40%, 50%, 60%, 70%, 80%, 90% or even more than 100% more efficient than the dense accelerators in processing sparse data).

In some instances, the dense accelerators have at least a 10% greater processing capability than the sparse accelerators, or even more than that (e.g., 20%, 30%, 40%, 50%, 60%, 70%, 80%, 90% or even more than 100% greater processing capability the sparse accelerators). For example, the dense accelerators are more efficient in processing dense data (e.g., dense layers, dense tensors) than sparse accelerators.

In some instances, sparse accelerators are distinguished from dense accelerators based at least on their greater efficiency in processing sparse data. Additionally, or alternatively, sparse accelerators are distinguished from dense accelerators based on their increased memory capacity and/or reduced number of raw FLOPs as compared to dense accelerators.

The computing system 310 is also shown including user interface(s) 315 and input/output (I/O) device(s) 316.

As shown in FIG. 3, hardware storage device(s) 340 is shown as a single storage unit. However, it will be appreciated that the hardware storage device(s) 340 is, in some embodiments, a distributed storage that is distributed to several separate and sometimes remote and/or third-party system(s) 320 (e.g., hardware storage devices 324). The computing system 310 can also comprise a distributed system, in some embodiments, with one or more of the components of computing system 310 being maintained/run by different discrete systems that are remote from each other and that each perform different tasks. In some instances, a plurality of distributed systems performs similar and/or shared tasks for implementing the disclosed functionality, such as in a distributed cloud environment.

In this manner, different layers of the machine learning model are distributable onto computing system 310 and/or across a distributed computing system 300 including computing system 310 and one or more third party system(s) 320.

The hardware storage device(s) 340 are configured to store the different data (e.g., input data 348) including various models such as machine learning model 342 which comprises dense layers 344 and sparse layers 346 which are used to process the input data 348.

The storage (e.g., hardware storage device(s) 340) includes computer-executable instructions 318 for instantiating or executing one or more of the models and/or engines shown in computing system 310. The models are configured as machine learning models or machine learned models, such as deep learning models and/or algorithms. In some instances, the one or more models are configured as engines or processing systems (e.g., computing systems integrated within computing system 310), wherein each engine (i.e., model) comprises one or more processors (e.g., hardware processor(s) 312) and computer-executable instructions 318 corresponding to the computing system 310.

An additional storage unit for storing machine learning (ML) Engine(s) 350 is presently shown in FIG. 3 as storing a plurality of machine learning models and/or engines. For example, computing system 310 comprises one or more of the following: a data retrieval engine 351, a distribution engine 352, and an implementation engine 353, which are individually and/or collectively configured to implement the different functionality described herein.

For example, the data retrieval engine 351 is configured to locate and access data sources, databases, and/or storage devices comprising one or more data types from which the data retrieval engine 351 can extract sets or subsets of data to be used as input data. The data retrieval engine 351 receives data from the databases and/or hardware storage devices, wherein the data retrieval engine 351 is configured to reformat or otherwise augment the received data to be used as training data or input data. Additionally, or alternatively, the data retrieval engine 351 is in communication with one or more remote/third-party systems (e.g., remote/third party system(s) 320) comprising remote/third party datasets and/or data sources. In some instances, these data sources comprise audiovisual services that record speech, text, images, and/or video.

The data retrieval engine 351 accesses electronic content comprising acoustic data, textual data, and/or other types of audio-visual data including video data, image data, holographic data, 3-D image data, etc. The data retrieval engine 351 is a smart engine that is able to learn optimal dataset extraction processes to provide a sufficient amount of data in a timely manner as well as retrieve data that is most applicable to the desired applications for which the machine learning models/engines will be used. For example, the data retrieval engine 351 can learn which databases and/or datasets will generate training data that will train a model (e.g., for a specific query or specific task) to increase accuracy, efficiency, and efficacy of that model in the desired layer distribution configuration.

In some embodiments, the computing system 310 comprises a distribution engine 352 which is configured to determine a distribution of the different layers of the machine learning model 342 across the different accelerators. The distribution engine 352 is also configured to facilitate the distribution prior to an instantiation of the model or re-distribution of the machine learning model after an instantiation of the model. In some instances, the re-distribution is based on identifying a potential improvement in one or more attributes of the computing system (e.g., model throughput, computing efficiency) and/or based on a scaling up or down of the machine learning model. In some embodiments, the re-distribution is implemented by migrating one or more experts from one accelerator to a different accelerator.

The distribution engine 352 is configured to dynamically identify the total number of accelerators that make up the computing system 310, as well as identify which accelerators are specialized or optimized hardware devices for dense layers versus sparse layers. Additionally, the distribution engine 352 is configured to identify which accelerators are full and/or which accelerators have available or anticipated processing capacity and/or memory space for storing and executing the one or more additional layers.

The distribution engine 352 is also configured to identify how many layers make up the machine learning model, as well as identify which layers are dense layers and which layers are sparse layers. The distribution engine 352 is further configured to identify how many experts are in each of the different sparse layers, as well as identify attributes of the experts (e.g., what specialized task is associated with an expert).

Thus, based on the number of dense layers and number of sparse layers (or number of experts across one or more sparse layers), the distribution engine 352 is configured to dynamically and automatically distribute the different layers onto one or more accelerators of the computing system 310. The distribution engine 352 is configured, in some instances, to distribute dense layers 344 onto dense accelerators 313 (e.g., accelerators determined to have capabilities for storing and/or executing the dense layers) and sparse layers 346 onto sparse accelerators 314 (e.g., accelerators that have more limited capacity and capabilities than the dense accelerators).

In some embodiments, the computing system 310 includes an implementation engine 353 in communication with any one of the models and/or ML engine(s) 350 (or all of the models/engines) included in the computing system 310 such that the implementation engine 353 is configured to implement, initiate, or run one or more functions of the plurality of ML engine(s) 350. In one example, the implementation engine 353 is configured to operate the data retrieval engines 351 so that the data retrieval engine 351 retrieves data at the appropriate time to be able to process input data 348. The implementation engine 353 facilitates the process communication and timing of communication between one or more of the ML engine(s) 350.

In other example, the implementation engine 353 is configured to implement one or more functionalities (i.e., processing input data 348) of the machine learning model 342 as distributed onto computing system 310 or across computing system 310 and third-party system(s) 320. The implementation engine 353 also is configured to implement the distribution engine 352 in order to identify a distribution or a re-distribution of the different layers of the machine learning model.

Furthermore, the implementation engine 353 is configured to select which experts distributed on the various accelerators will be used in processing the input data 348. By implementing the systems and methods according to these disclosed embodiments, the computing system 310 is able to achieve technical benefits, such as being customizable and scalable. In particular, different experts can be used at different times in processing the input data 348. Thus, the system can be configured to select a limited number of experts to use in processing the input data based on a type of input data, formatting of input data, context of the input data, and/or downstream applications of the processed input data. Thus, when one or more experts are identified as the experts that will be used in processing the input data, the system can distribute or re-distribute one or more sparse layers comprising those identified experts onto different accelerators in order to increase the model throughput and increase computational efficiency of the system.

Figure 4A:
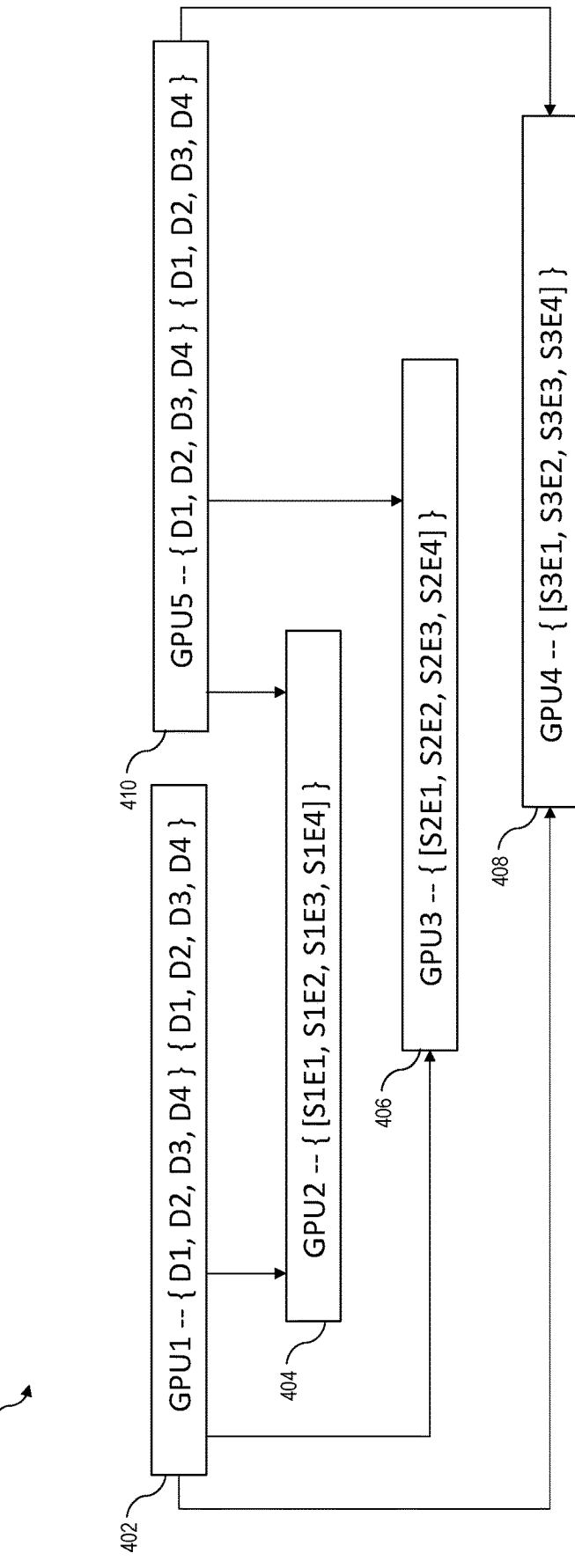
FIGS. 4A-4D illustrates various example embodiments of a special MOE machine learning model distributed

Attention will now be directed to FIGS. 4A-4D, which illustrate various embodiments of a machine learning model (e.g., machine learning model 342) distributed onto a computing system (e.g., computing system 310). Attention will first be directed to FIG. 4A, which illustrates an example embodiment of the novel configuration. As illustrated, computing system 400 comprises a plurality of accelerators (e.g., accelerator 402, accelerator 404, accelerator 406, accelerator 408, and accelerator 410). In some instances, as shown in FIG. 4A, the accelerators are configured as GPUs (e.g., GPU1, GPU2, GPU3, GPU4, and GPU5). Accelerator 402 and accelerator 410 are configured to process input using dense layers. For example, a plurality of dense layers (e.g., D1, D2, D3, and D4) are distributed onto accelerator 402 and accelerator 410. Accelerator 404, accelerator 406, and accelerator 408 are configured to process inputs from previous layers using sparse layers.

For example, a first sparse layer comprising a first plurality of experts (e.g., S1E1, S1E2, S1E3, and S1E4) are distributed onto accelerator 404, a second sparse layer comprising a second plurality of experts (e.g., S2E1, S2E2, S2E3, and S2E4) are distributed onto accelerator 406, and a third sparse layer comprising a third plurality of experts (e.g., S3E1, S3E2, S3E3, and S3E4) are distributed onto accelerator 408. In the aforementioned experts, the notation is as follow: "S" refers to sparse layer with the number following indicating which number of sparse layer and "E" referring to expert with the number following indicating which number of expert. While each accelerator is shown having at least four layers, it should be appreciated that any number of layers, including no layers, are distributable onto any one of the accelerators or across multiple accelerators.

As illustrated in FIG. 4A, accelerator 404, accelerator 406, and accelerator 408 each are configured to receive multiple inputs from accelerator 402 and accelerator 410 simultaneously through interleaving. In this manner, multiple accelerators are able to process inputs at the same time, thus increasing the computational efficiency and processing power of the computing system.

By distributing the different layers in this manner, further technical advantages are achieved. For example, the system is able to be equipped with a first set of customized hardware that has been optimized for processing dense layers and a second set of customized hardware that has been optimized for processing sparse layers. This is not possible in previous configurations where accelerators are configured to process input with both dense layers and sparse layers In some instances, hardware devices that are optimized for dense layers are characterized by high processing power attributes. Additionally, such hardware devices are also characterized by smaller memory storage. In some instances, hardware devices that are optimized for sparse layers are characterized by high memory storage attributes. Additionally, such hardware devices are also characterized by lower processing power attributes than the hardware devices that are optimized for the dense layers.

Figure 4B:
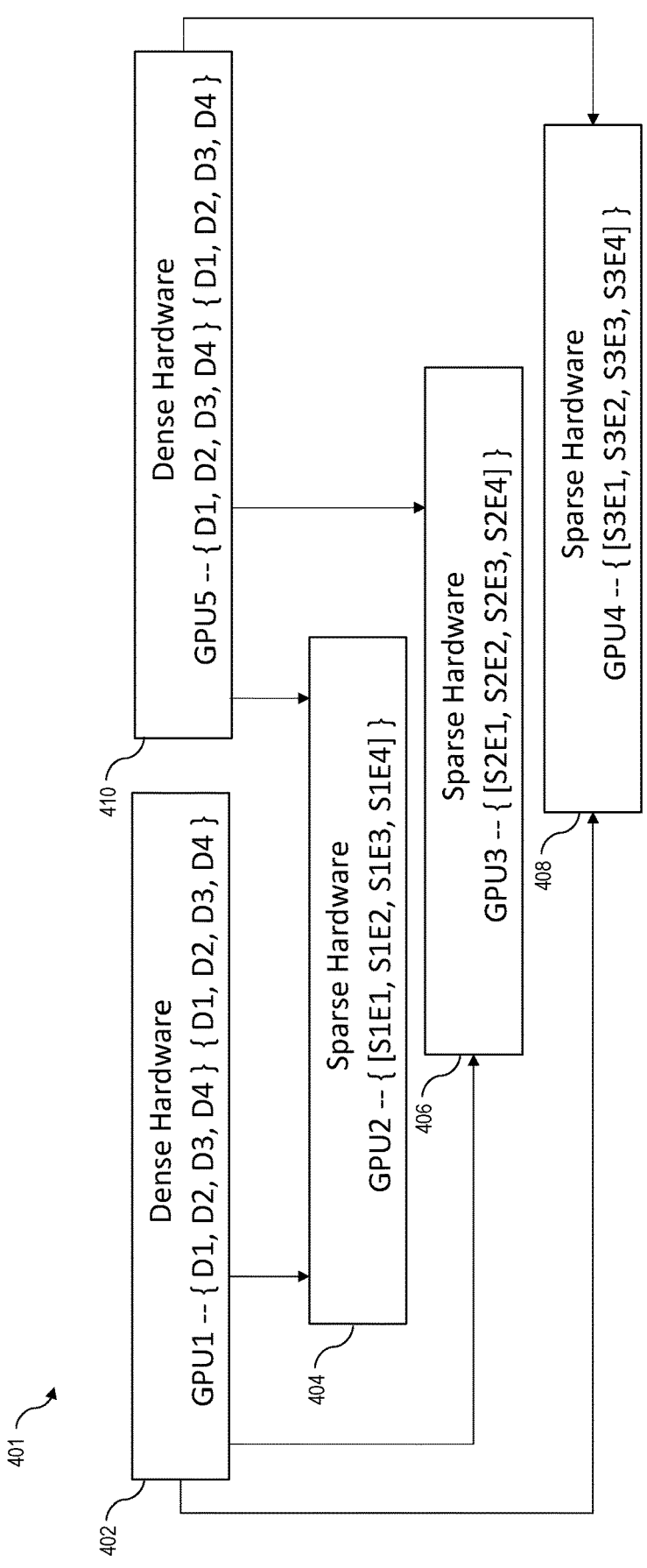

Attention will now be directed to FIG. 4B, which illustrates a machine learning model distributed onto a computing system 401 comprising customized hardware. For example, FIG. 4B comprises similar components as FIG. 4A, wherein accelerator 402 and accelerator 410 are configured for dense layers (i.e., dense hardware), and wherein accelerator 404, accelerator 406, and accelerator 408 are configured for sparse layers. By customizing the different hardware components of the computing system 400, the computing system's computational efficiency and processing power is increased.

In some instances, efficiency is characterized by how much time a layer is used in processing versus the memory it occupies on a particular accelerator. Thus, an efficient system is one where layers that do little processing occupy smaller amounts of memory than layers that participate in large amounts of processing which occupy larger amounts of memory. Alternatively, layers that do little processing (e.g., sparse layers) but require large amounts of memory can be distributed onto specialized hardware (e.g., dense hardware) that is optimized for memory storage over processing capabilities, while layers (e.g., dense layers) are distributed on specialized hardware (e.g., sparse hardware) that is optimized for processing capabilities over storage capacity.

The disclosed embodiments beneficially achieve additional technical benefits, including being highly scalable. Attention will now be directed to FIG. 4C, which illustrates computing system 403, which is representative of computing system 401 further comprising an additional accelerator (e.g., accelerator 412) which is configured as a sparse hardware device. A fourth sparse layer comprising a fourth plurality of experts is distributed onto accelerator 412. The fourth plurality of experts, as illustrated, comprises two experts (e.g., S4E1 and S3E4). It should be appreciated that any plurality of experts on any of the different accelerators may comprise one or more experts.

Figure 4C:
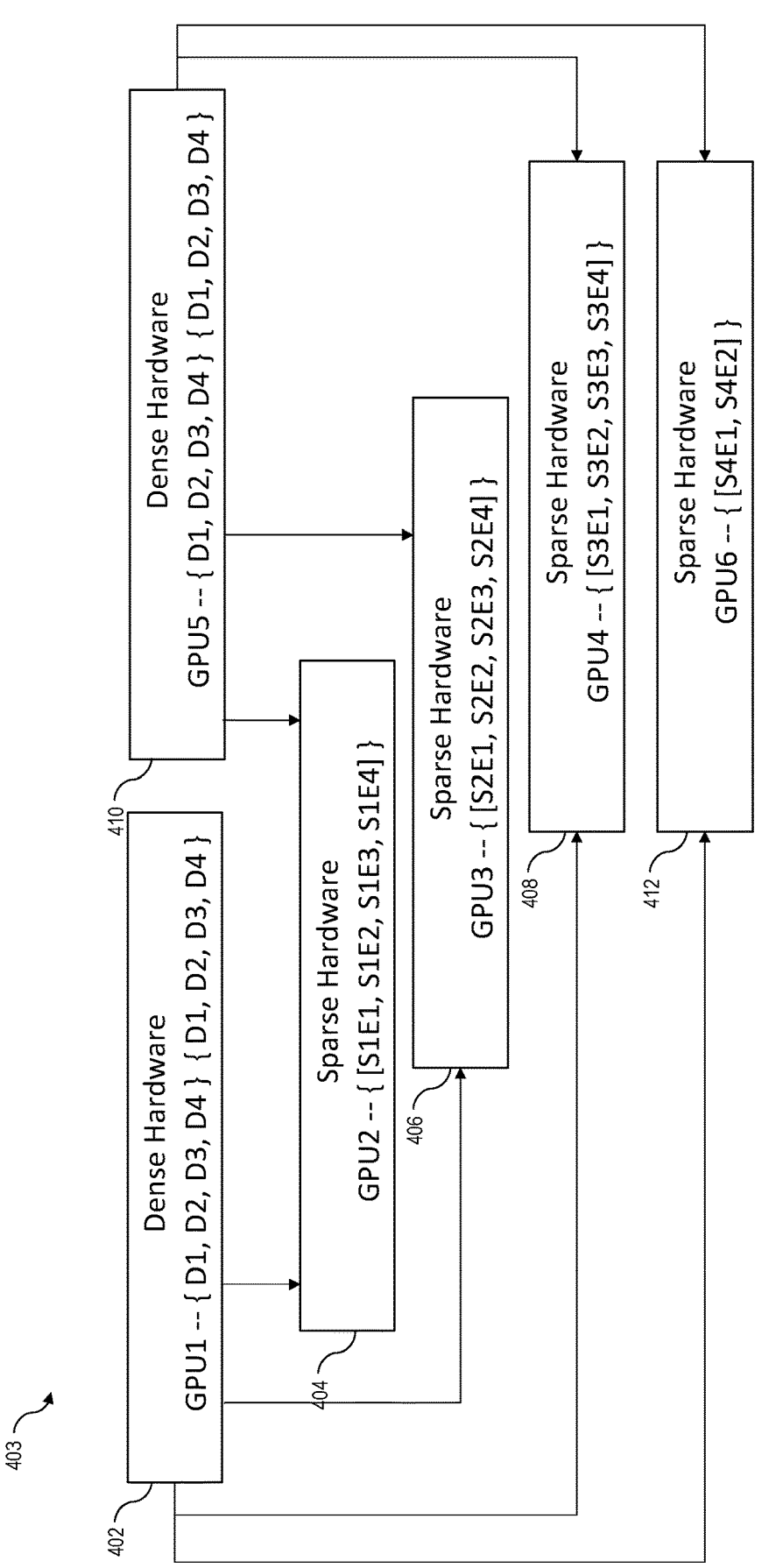

Because the layers of the machine learning model are distributed in a selective manner (i.e., dense layers on dense hardware and sparse layers on sparse hardware), the machine learning model is highly scalable, as illustrated in FIG. 4C. For example, to increase throughput of the system, additional accelerators (e.g., GPU6) can be added in smaller increments. In this manner, smaller or larger accelerators can be added into the system to accommodate for one or more additional sparse layers comprising one or more additional experts. This also provides additional flexibility and customizability in how the different layers of the machine learning model are distributed onto the computing system.

Figure 4D:
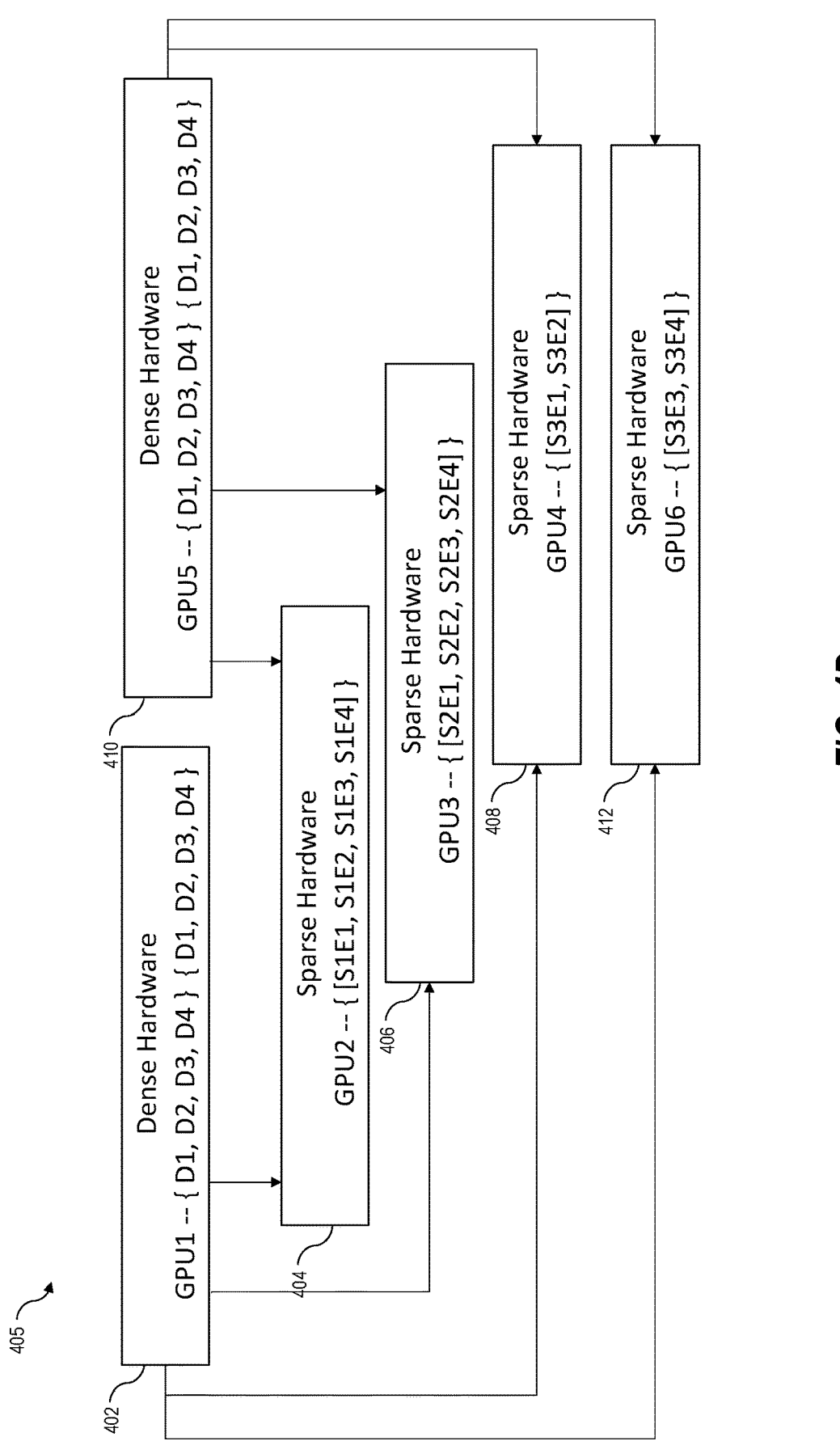

Additionally, or alternatively, one or more experts from another accelerator could be migrated onto the additional accelerator. For example, as illustrated in FIG. 4D, computing system 405, which is representative of computing system 403 with similar hardware devices, but different distribution of machine learning model layers, is shown having some experts (e.g., S3E3 and S3E4) that were originally distributed onto accelerator 408 (see FIG. 4C) being now distributed onto accelerator 412. Where an additional accelerator that had available processing and memory storage capacities was identified, the system is able to re-distribute (i.e., migrate) one or more experts onto the additional accelerator. For example, if the system selected expert S3E1 and experts S3E3 as the experts that would be used in processing new input data, the system determined that a redistribution of the layers would increase the model throughput and facilitate an improvement in computational processing.

In contrast, if S3E1 and S3E3 had remained on the same sparse hardware (e.g., accelerator 408), the input data would have had to be processed in series, first with S3E1 and then with S3E3. However, now with the redistribution, the input data can be processed in parallel using both accelerator 408 and accelerator 412. In this manner, latency is reduced (one layer is not waiting on another layer to finish processing) and model throughput is increased.

It will be appreciated that the redistribution and migration of the experts can happen during downtime and/or during processing being performed by the model, based on dynamic evaluation of the capabilities and constraints associated with executing the model on different datasets.

Because each expert is trained on a specific task or data application, the machine learning model is able to process input data using a variety of different training tasks or applications. This special MOE configuration allows for the machine learning model to incorporate new experts or updated experts easily and efficiently without having to re-train the entire model and/or without having to reconfigure the other layers distributed onto the computing system.

Additionally, in some embodiments, new experts are added onto available accelerators or onto new accelerators which are easily integrated into the system. This is a highly efficient configuration because hardware is not left idle (i.e., multiple hardware devices are processing multiple inputs simultaneously). This is a significant improvement over conventional mixture of expert systems which are not easily adaptable to new tasks, scalable, and have limited throughput due to some hardware devices being idle while other hardware devices are processing an input.

Figure 5:
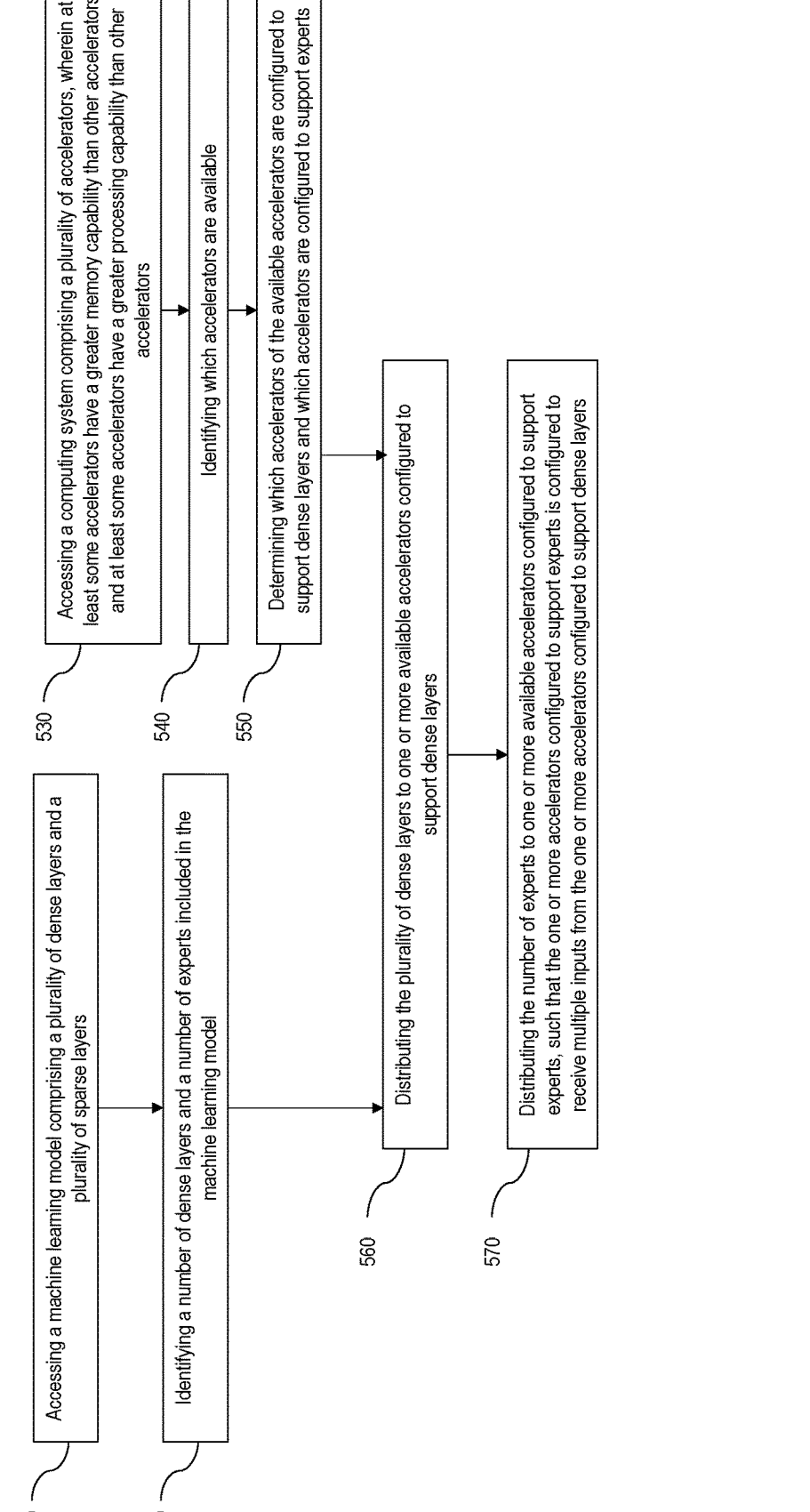
FIG. 5 illustrates one embodiment of a flow diagram having a plurality of acts for determining a distribution of a machine learning model comprising an MOE.

Attention will now be directed to FIG. 5 which illustrates a flow diagram 500 that includes various acts (act 510, act 520, act 530, act 540, act 550, act 560, and act 570) associated with exemplary methods that can be implemented by computing system 310 for distributing a mixture-of-expert machine learning model onto a customized computing system.

The first illustrated act includes an act for accessing a machine learning model comprising a plurality of dense layers and a plurality of sparse layers (act 510). Because the model has both dense and sparse layers, the machine learning model is able to implement a plurality of different experts within the sparse layers, which provides additional flexibility and customizability of the machine learning for different training tasks, domains, and applications. Additionally, the plurality of sparse layers is interleaved with the plurality of dense layers.

The system then identifies a number of dense layers and a number of experts included in the machine learning model (act 520). Additionally, the system accesses a computing system comprising a plurality of accelerators, wherein at least some accelerators have a greater memory capability than other accelerators and at least some accelerators have a greater processing capability than other accelerators (act 530). By identifying the specific number of elements in each of the computing system and machine learning model, the system is able to generate an accurate and efficient distribution strategy. Furthermore, the accelerators are hardware accelerators. For example, one or more hardware accelerators are configurable as graphics unit processors.

Subsequently, the system identifies which accelerators are available (act 540) and determines which accelerators of the available accelerators are configured to support dense layers and which accelerators are configured to support experts (act 550).

After accessing the machine learning model and the computing system the system is configured to distribute the plurality of dense layers to one or more available accelerators configured to support dense layers (act 560) and distribute the number of experts to one or more available accelerators configured to support experts, such that the one or more accelerators configured to support experts is configured to receive multiple inputs from the one or more accelerators configured to support dense layers (act 570).

By generating a distribution strategy in this manner, efficiency is improved for the system and model combination. This is because layers that do little processing occupy smaller amounts of memory than layers that participate in large amounts of processing which occupy larger amounts of memory. Alternatively, layers that do little processing (e.g., sparse layers) but require large amounts of memory can be distributed onto specialized hardware (e.g., dense hardware) that is optimized for memory storage over processing capabilities, while layers (e.g., dense layers) are distributed on specialized hardware (e.g., sparse hardware) that is optimized for processing capabilities over storage capacity.

It should be appreciated that each sparse layer included in the plurality of sparse layers further comprises one or more experts such that the machine learning model is configured as an MOE machine learning model.

In some embodiments, the method further comprises an act of accessing an additional accelerator configured to support one or more experts and an act of integrating the additional accelerator into the computing system such that the computing system is an expanded computing system.

In such embodiments, the system is able to access one or more additional experts associated with the machine learning model and distribute the one or more additional experts onto the additional accelerator.

Additionally, or alternatively, the system is configured to select a limited number of experts distributed across one or more accelerators such that the limited number of experts being selected to process input data, access a set of input data; and process the input data using at least the limited number of experts.

Figure 6:
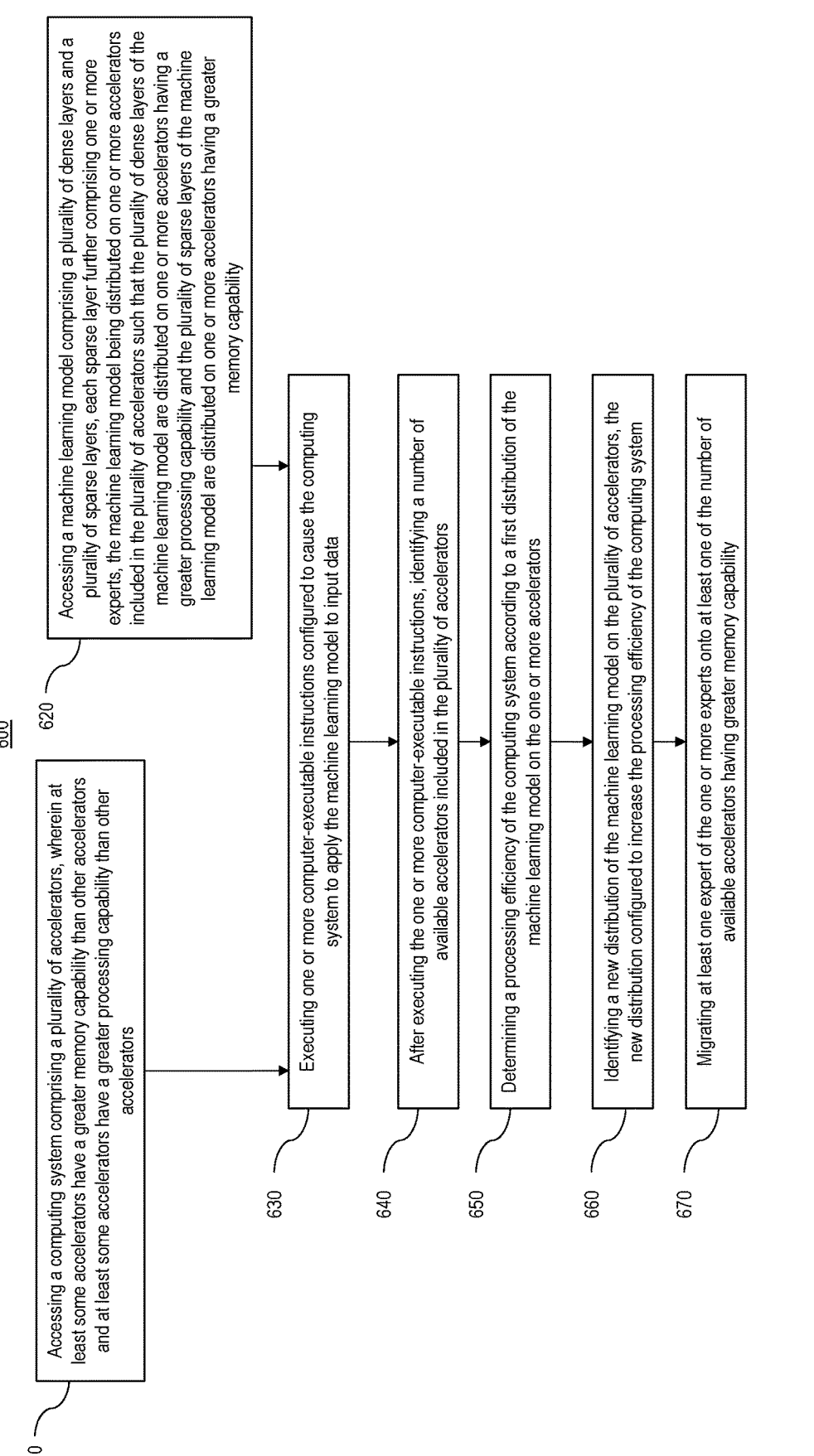
FIG. 6 illustrates one embodiment of a flow diagram having a plurality of acts for migrating one or more experts of a machine learning model to one or more different accelerators of a computing system.

Attention will now be directed to FIG. 6 which illustrates a flow diagram 600 that includes various acts (act 610, act 620, act 630, act 640, act 650, act 660, and act 670) associated with exemplary methods that can be implemented by computing system 310 for determining a re-distribution of one or more layers of an MOE machine learning model.

The first illustrated act includes an act of accessing a computing system comprising a plurality of accelerators, wherein at least some accelerators have a greater memory capability than other accelerators and at least some accelerators have a greater processing capability than other accelerators (act 610).

The method also includes an act of accessing a machine learning model comprising a plurality of dense layers and a plurality of sparse layers, each sparse layer further comprising one or more experts, the machine learning model being distributed on one or more accelerators included in the plurality of accelerators such that the plurality of dense layers of the machine learning model are distributed on one or more accelerators having a greater processing capability and the plurality of sparse layers of the machine learning model are distributed on one or more accelerators having a greater memory capability (act 620). The one or more accelerators having a greater processing capability are configured as dense accelerators which are optimized to process dense layers. The one or more accelerators having a greater memory capability are configured as sparse accelerators which are optimized to process sparse layers. The dense accelerators, therefore, have a greater processing capability than the sparse accelerators, and the sparse accelerators having a greater memory capacity than dense accelerators. This is because sparse layers require more memory than dense layers but are less computationally intensive, while dense layers require less memory than sparse layers but are more computationally intensive.

By distributing the different layers in this manner, further technical advantages are achieved. For example, the system is able to be equipped with a first set of customized hardware that has been optimized for processing dense layers and a second set of customized hardware that has been optimized for processing sparse layers. This is not possible in previous configurations where accelerators are configured to process input with both dense layers and sparse layers.

After accessing the computing system and the machine learning model, the system is configured to execute one or more computer-executable instructions configured to cause the computing system to apply the machine learning model to input data (act 630).

After executing the one or more computer-executable instructions, the system then identifies a number of available accelerators included in the plurality of accelerators (act 640) and determines a processing efficiency of the computing system according to a first distribution of the machine learning model on the one or more accelerators (act 650).

Based on at least the processing efficiency, the system identifies a new distribution of the machine learning model on the plurality of accelerators, the new distribution configured to increase the processing efficiency of the computing system (act 660). Finally, the system migrates at least one expert of the one or more experts onto at least one of the number of available accelerators having greater memory capability in order to facilitate an increase in the processing efficiency of the computing system (act 670). By implementing systems and methods in this manner, the machine learning model is able to be optimized based on increasing model throughput and facilitating an improvement in hardware distribution efficiency.

Furthermore, such disclosed embodiments provide for the ability to scale the machine learning model into larger or smaller numbers of layers, including integrating or removing one or more different experts as part of the MOE. This facilitates a decrease in computation and time for training and for processing new input data. For example, in some instances, the method further comprises an act of selecting a limited number of experts distributed across one or more accelerators, the limited number of experts being selected to process input data, accessing a set of input data; and processing the input data using at least the limited number of experts.

Additionally, some methods also include acts of, based on the limited number of experts selected, determining an additional distribution of the limited number of experts across the plurality of accelerators. In this manner, the system is able to migrate one or more of the limited number of experts to a different accelerator according to the additional distribution.

Example Computing Systems

Embodiments of the present invention may comprise or utilize a special purpose or general-purpose computer (e.g., computing system 310) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media (e.g., hardware storage device (s) 340 of FIG. 3) that store computer-executable instructions (e.g., computer-executable instructions 318 of FIG. 1) are physical hardware storage media/devices that exclude transmission media. Computer-readable media that carry computer-executable instructions or computer-readable instructions (e.g., computer-executable instructions 318) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 330 of FIG. 3) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more hardware processors;
one or more hardware storage devices that store computer-executable instructions that are executable by the one or more hardware processors for managing a distribution of sparse and dense layers of a mixture-of-experts (MOE) model on a plurality of accelerators;
said plurality of accelerators, which include:
a first set of accelerators that are structured to support a plurality of sparse layers as a result of the first set of accelerators having dense hardware that has greater memory capacity and smaller processing capability, and
a second set of accelerators that are structured to support a plurality of dense layers as a result of the second set of accelerators having sparse hardware that has greater processing capability and smaller memory capacity;
a machine learning model comprising the plurality of dense layers and the plurality of sparse layers, wherein:
the machine learning model is distributed on the plurality of accelerators,
the plurality of dense layers are distributed on the second set of accelerators,
the plurality of sparse layers are distributed on the first set of accelerators, and
at least one accelerator storing one or more sparse layers of the machine learning model is configured to receive multiple inputs from one or more accelerators storing dense layers of the machine learning model.

2. The computing system of claim 1, wherein each sparse layer included in the plurality of sparse layers further comprises one or more experts such that the machine learning model is configured as a mixture-of-experts machine learning model.

3. The computing system of claim 1, wherein each expert is trained on a unique task.

4. The computing system of claim 1, wherein one or more accelerators are hardware accelerators.

5. The computing system of claim 4, wherein one or more accelerators are configured as graphics unit processors.

6. The computing system of claim 1, wherein the second set of accelerators are configured as dense accelerators with at least a 10% greater capability for processing the dense layers than the first set of accelerators which are configured as sparse accelerators.

7. The computing system of claim 1, wherein the first set of accelerators are configured as sparse accelerators which are at least 10% more efficient in processing sparse data than the second set of accelerators which are configured as dense accelerators.

8. The computing system of claim 1, wherein the plurality of sparse layers is interleaved with the plurality of dense layers.

9. A method for managing a distribution of machine learning model comprising a mixture-of-experts (MOE) on a computing system, the method comprising:
accessing a machine learning model comprising a plurality of dense layers and a plurality of sparse layers;
identifying a number of dense layers and a number of experts included in the machine learning model;
accessing a computing system comprising a plurality of accelerators, wherein:
a first set of the accelerators are structured to support the plurality of sparse layers as a result of the first set of accelerators having dense hardware that has greater memory capacity and smaller processing capability, and
a second set of the accelerators are structured to support the plurality of dense layers as a result of the second set of accelerators having sparse hardware that has greater processing capability and smaller memory capacity;
identifying which accelerators are available;

determining which accelerators of the available accelerators are configured to support the plurality of dense layers and which accelerators are configured to support the experts;

distributing the plurality of dense layers to one or more available accelerators configured to support the dense layers; and distributing the number of experts to one or more available accelerators configured to support experts, such that the one or more accelerators configured to support experts is configured to receive multiple inputs from the one or more accelerators configured to support dense layers.

10. The method of claim 9, wherein each sparse layer included in the plurality of sparse layers further comprises one or more experts such that the machine learning model is configured as a mixture-of-experts machine learning model.

11. The method of claim 9, further comprising:

accessing an additional accelerator configured to support one or more experts; and integrating the additional accelerator into the computing system such that the computing system is an expanded computing system.

12. The method of claim 11, further comprising:

accessing one or more additional experts associated with the machine learning model; and distributing the one or more additional experts onto the additional accelerator.

13. The method of claim 9, further comprising:

selecting a limited number of experts distributed across one or more accelerators, the limited number of experts being selected to process input data;

accessing a set of input data; and processing the input data using at least the limited number of experts.

14. The method of claim 9, wherein the plurality of sparse layers is interleaved with the plurality of dense layers.

15. The method of claim 9, wherein the plurality of accelerators are hardware accelerators.

16. The method of claim 9, wherein the plurality of accelerators is configured as graphics unit processors.

17. A method for determining a re-distribution of machine learning model comprising a mixture-of-experts (MOE) on a computing system, the method comprising:

accessing a computing system comprising a plurality of accelerators, wherein the plurality of accelerators are structured such that:

a first set of accelerators are structured to support a plurality of sparse layers as a result of the first set of accelerators having dense hardware that has greater memory capacity and smaller processing capability, and a second set of accelerators are structured to support a plurality of dense layers as a result of the second set of accelerators having sparse hardware that has greater processing capability and smaller memory capacity;

accessing a machine learning model comprising the plurality of dense layers and the plurality of sparse layers, wherein:

each sparse layer further comprising one or more experts, the machine learning model is distributed on the plurality of accelerators, the plurality of dense layers are distributed on the second set of accelerators, which have the relatively greater processing capability, and the plurality of sparse layers are distributed on the first set of accelerators, which have the relatively greater memory capability;

executing one or more computer-executable instructions configured to cause the computing system to apply the machine learning model to input data;

after executing the one or more computer-executable instructions, identifying a number of available accelerators included in the plurality of accelerators;

determining a processing efficiency of the computing system according to a first distribution of the machine learning model on the one or more accelerators; and identifying a new distribution of the machine learning model on the plurality of accelerators, the new distribution configured to increase the processing efficiency of the computing system.

18. The method of claim 17, further comprising:

migrating at least one expert of the one or more experts onto at least one of the number of available accelerators having greater memory capability according to the new distribution.

19. The method of claim 17, further comprising:

selecting a limited number of experts distributed across one or more accelerators, the limited number of experts being selected to process input data;

accessing a set of input data; and processing the input data using at least the limited number of experts.

20. The method of claim 17, further comprising:

based on the limited number of experts selected, determine an additional distribution of the limited number of experts across the plurality of accelerators; and migrate one or more of the limited number of experts to a different accelerator according to the additional distribution.

* * * * *